(12) United States Patent
Ganzel (10) Patent No.: US 6,254,200 B1
(45) Date of Patent: Jul. 3, 2001

(54) SUPPLY VALVE FOR A HYDRAULIC CONTROL UNIT OF A VEHICULAR BRAKING SYSTEM

(75) Inventor: Blaise Ganzel, Ann Arbor, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 09/428,941

(22) Filed: Oct. 28, 1999

Related U.S. Application Data (60) Provisional application No. 60/106,409, filed on Oct. 30, 1998.

(51) Int. Cl.[7] .............................. B60T 8/32; B60T 8/36; F16K 31/06; F16K 31/42
(52) U.S. Cl. ..................................... 303/119.2; 303/113.1; 303/901; 303/116.1
(58) Field of Search .............................. 303/119.2, 119.3, 303/113.1, 900, 901, 116.1, 116.2, 84.1, 117.1, 113.2; 251/129.01–129.22, 30.31, 38; 137/627.5, 596.17, 625.65, 630

(56) References Cited

U.S. PATENT DOCUMENTS

| 4,782,862 | 11/1988 | Nguyen . |
| 5,810,330 | 9/1998 | Eith et al. . |
| 5,865,213 | 2/1999 | Scheffel et al. . |
| 5,882,090 | * 3/1999 | Ganzel ............................. 303/113.2 |

FOREIGN PATENT DOCUMENTS

| 34 22 214 C2 | 12/1984 | (DE) . |
| 44 41 150 A1 | 5/1996 | (DE) . |
| 219118 | * 8/2000 | (JP) . |

\* cited by examiner

Primary Examiner—Douglas C. Butler
(74) Attorney, Agent, or Firm—MacMillian, Sobanski & Todd, LLC (57) ABSTRACT

A hydraulic Control unit of a vehicular brake system includes a housing having a bore formed therein. A normally closed solenoid valve is retained in the bore of the housing. The solenoid valve includes a primary valve and a pilot valve, wherein a cross section of the primary valve is greater that a cross section of the pilot valve. A spring cooperates with the pilot valve so that the pilot valve is open when the primary valve is open.

20 Claims, 5 Drawing Sheets

SUPPLY VALVE FOR A HYDRAULIC CONTROL UNIT OF A VEHICULAR BRAKING SYSTEM

CROSS REFERENCE TO RELATED APPLICATION

This claims the benefit of United States provisional patent application identified as application Ser. No. 60/106,409 filed Oct. 30, 1998.

BACKGROUND OF THE INVENTION

This invention relates in general to electronically controlled vehicular brake systems. In particular, this invention is concerned with a hydraulic control unit for a vehicular brake system having a control valve that controls fluid from a master cylinder to an inlet of a pump.

Electronically controlled vehicular brake systems may include anti-lock, traction control, and vehicle stability control functions. During various braking functions, such as vehicle stability control (VSC), a pump is activated to provide high-pressure fluid to a wheel brake. For certain events, the pump draws fluid from a master cylinder. A normally closed supply valve is positioned in a hydraulic connection between the master cylinder and an inlet to the pump. During a various braking events, the supply valve is opened so that the pump draws fluid from the master cylinder.

During a vehicle stability control event, a driver may have applied the brake pedal, thereby pressurizing fluid in master cylinder. The VSC supply valve must be able to open under such relatively high-pressure situations so that fluid can be drawn to the pump and supplied to wheel brakes.

SUMMARY OF THE INVENTION

This invention relates to electronically control vehicular brake systems and a control valve for such systems. The present control valve is particularly adapted for a supply valve in a brake system having a vehicle stability control function. The control valve opens as desired under both high master cylinder pressure conditions and low master cylinder pressure conditions.

In a preferred embodiment, a hydraulic control unit of a vehicular brake system includes a housing having a bore formed therein. A normally closed solenoid valve is retained in the bore of the housing. The solenoid valve includes a primary valve and a pilot valve, wherein a cross section of the primary valve is greater that a cross section of the pilot valve. A spring cooperates with the pilot valve so that the pilot valve is open when the primary valve is open.

Various objects and advantages of this invention will become apparent to those skilled in the art from the following detailed description of the preferred embodiment, when read in light of the accompanying drawings.

DETAILED DESCRIPTION OF THE PREFERRED EMBODIMENTS

Figure 1:
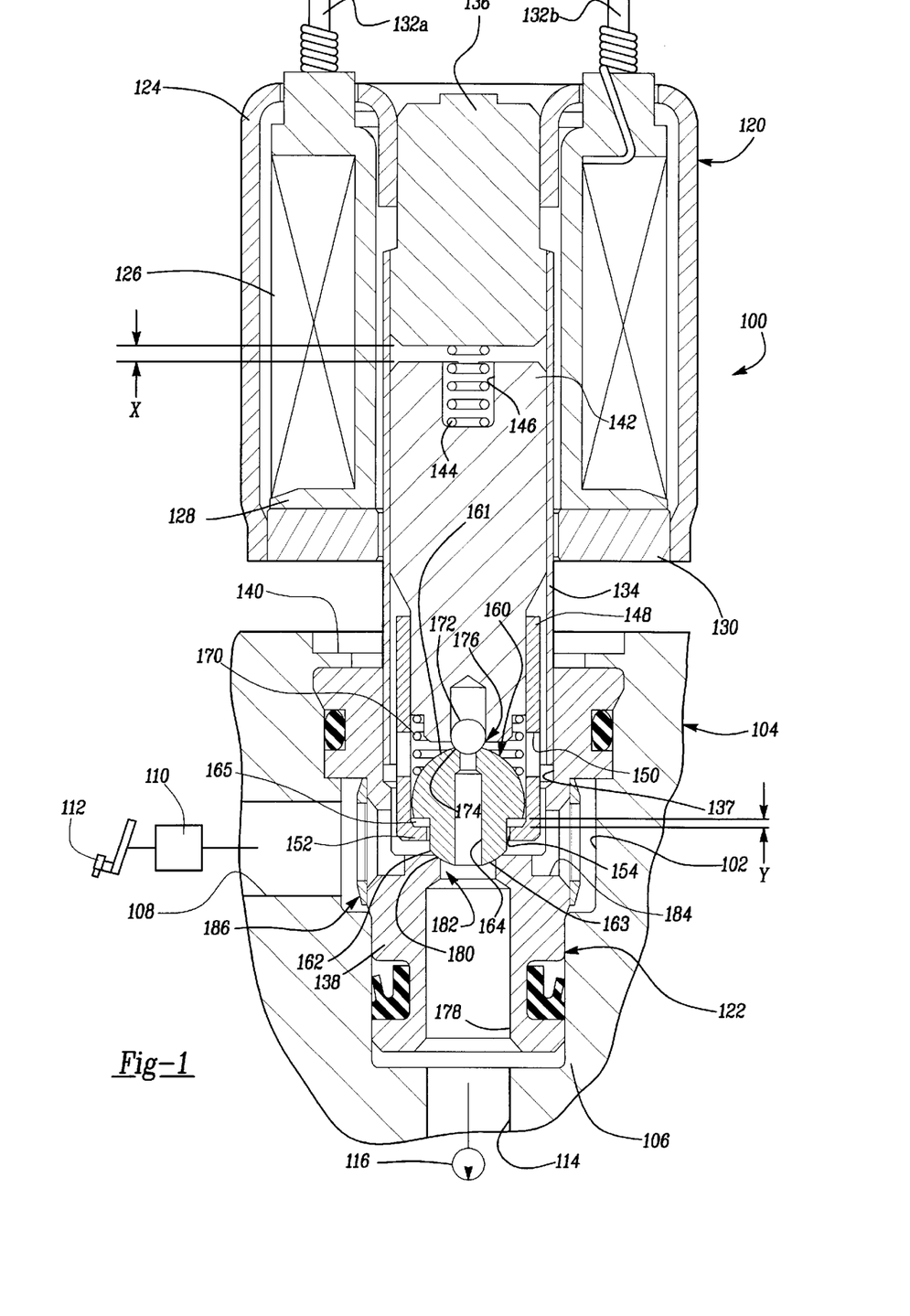
FIG. 1 is a sectional view of a first embodiment of a control valve according to the present invention, mounted on a hydraulic control unit in a hydraulic conduit between a master cylinder and an inlet to a pump.

A first embodiment of a fluid control valve according to the present invention is indicated generally at 100 in FIG. 1. The valve 100 is particularly adapted to control fluid pressure in an electronically controlled vehicular brake system. Such a brake system can include anti-lock, traction control, and vehicle stability control functions.

The control valve 100 is an electronically activated, normally closed solenoid valve mounted in a stepped bore 102 of a hydraulic control unit (HCU) 104 of the vehicular brake system. In FIG. 1, the control valve 100 is illustrated in the nonenergized, normally closed position. The HCU 104 includes a housing 106 in which the bore 102 is formed. The housing 106 includes additional bores (not illustrated) mounting other components such as isolation valves and dump valves, none of which are illustrated. A first fluid conduit 108 formed in the housing 106 is in fluid communication at one end with the bore 102 and is in fluid communication with a source of hydraulic brake fluid at the opposite end. Preferably, the source of hydraulic fluid is a master cylinder 110. A brake pedal 112 is connected to the master cylinder 110 in a well known manner. A second fluid conduit 114 formed in the housing 106 is in fluid communication at one end with the bore 102 and is in fluid communication with an inlet of a pump 116. While not so illustrated, the pump 116 is preferably mounted in a bore in the housing 106.

The control valve 100 is a normally closed solenoid valve. When the control valve 100 is not energized (the condition illustrated in FIG. 1), fluid from the master cylinder 110 is not in fluid communication with the inlet of the pump 116. When the control valve 100 is energized, fluid pressure passes from the master cylinder 110 through the valve 100 to the inlet of the pump 116 through a relatively large orifice. Such a relatively large orifice is desirable, particularly during traction control and/or vehicle stability control events.

The control valve 100 includes a coil subassembly 120 and a valve body subassembly 122. The coil subassembly 120 is preferably pressed onto the valve body subassembly 122.

The coil subassembly 120 includes a cup-shaped casing 124 that provides a flux return path. A coil 126 can be mounted on a bobbin 128 and inserted into the casing 124. In other embodiments, a bobbin-less coil can be substituted for the coil 126 and bobbin 128. A flux ring 130 is pressed into the casing 124 to secure the coil 126 and complete the flux return path. A pair of winding terminals 132a and 132b extend outwardly through respective openings in the casing 124 and are adapted to be connected to an electronic control module (not illustrated) for inducing a magnetic field in a well known manner.

The valve body subassembly 122 includes a sleeve 134. A pole piece 136 is preferably inserted into and secured to a first end of the sleeve 134. An opposite end of the sleeve 134 is inserted into a bore 137 formed in a valve body 138. The valve body 138 is received in the stepped bore 102 of the housing 106. An annular lip 140, preferably formed by swaging, retains the valve body 138 in the bore 102.

A generally cylindrical armature 142 is slidably received in the sleeve 134. A spring 144, illustrated as a coil spring, is placed between the pole piece 136 and the armature 142. A cavity 146 is formed in a first end of the armature 142 to receive and seat the spring 144. The spring 144 urges the armature downwardly away from the pole piece 136 a predetermined distance X in a normally closed position when the coil subassembly 120 is not energized. When a magnetic field is induced by the energized coil subassembly 120, the armature 142 is urged toward the pole piece 136 against the force of the spring 144 to open the control valve 100.

A generally cylindrical cage 148 is secured to a reduced-diameter portion of the armature 142. The cage 148 includes a plurality of fluid openings 150 that permit fluid to pass into an interior volume of the cage 148. An end surface 152 of the cage 148 includes an opening 154.

A poppet 160 is received in the interior volume of the cage 148 between the armature 142 and the end surface 152. The poppet 160 includes a first (preferably) spherical surface 161 oriented toward the armature 142. Opposite of the armature 142, the poppet 160 includes a reduced diameter portion forming a projection 162. The projection 162 is slidably received in the opening 154 in the end surface 152. A second (preferably) spherical surface 163 is formed on the poppet 160 opposite the armature 142. A fluid passage 164 is formed through the poppet 160 from the first spherical surface 161 to the second spherical surface 162. An annular ledge 165 is formed about the projection 162. The ledge 165 is spaced a predetermined distance Y from the end surface 152 when the control valve 100 is not energized. The poppet 160 can be formed by machining a ball formed from a suitable material.

A spring 170 is provided between the armature 142 and the poppet 160. A first end of the spring 170 engages the armature 142. An opposite end of the spring 170 engages the poppet 160. A ball 172 is pressed into a cavity in the armature 142 and is received in a seat 174 formed in the first spherical surface 161. The seat 174 is preferably formed about the fluid passage 164. The ball 172 and the seat 174 cooperate to form a pilot valve 176 having a relatively small cross section. When the control valve 100 is not energized, the ball 172 engages the seat 174 to prevent fluid from passing through the pilot valve 176.

The cage 148 and the projection 162 of the poppet 160 are received in the bore 137 of the valve body 138. An axial fluid passage 178 having a relatively large diameter is formed in the valve body 138. The fluid passage 178 is in fluid communication with the second fluid conduit 114 in the housing 106. A seat 180 is formed in the valve body 138. The second spherical surface 163 and the seat 180 form a primary valve 182. When the control valve 100 is not energized, the second spherical surface engages the seat 180 to prevent fluid from passing through the primary valve 182.

A plurality of fluid passages 184 are formed about the valve body 138. An annular filter assembly 186 is fitted on the valve body 138 and surrounds the fluid passages 184. Fluid from the first fluid conduit 108 in the housing 106 can travel through the filter assembly 186 and into passage 184 to pass through the pilot valve 176 and/or the primary valve 182.

As stated above, when the control valve 100 is not energized, a distance X is provided between the facing surfaces of the pole core 136 and the armature 142 and a distance Y is provided between facing surfaces of the ledge 165 of the poppet and the end surface 152 of the cage 148. The distance Y is less than the distance X.

When the control valve 100 is energized, the armature 142 is urged toward the pole piece 136 against the force of the spring 144. As the armature 142 moves toward the pole piece 136, the pilot valve 176 is opened as the ball 172 separates from the seat 174. After the armature 142 and the attached cage 148 travel the distance Y, the end surface 152 of the cage 148 lifts the second spherical surface 163 away from the seat 180 to open the primary valve 182. When the armature 142 has reached its full travel (the distance X), both the pilot valve 176 and the primary valve 182 are open to permit fluid to flow from the master cylinder 110 to the inlet of the pump 116. The second spring 170 forces the poppet 160 against the end surface 152 so that the pilot valve 176 is open. The spring force of the second spring 170 is selected so that it is less than the spring force of the first spring 144.

Figure 2:
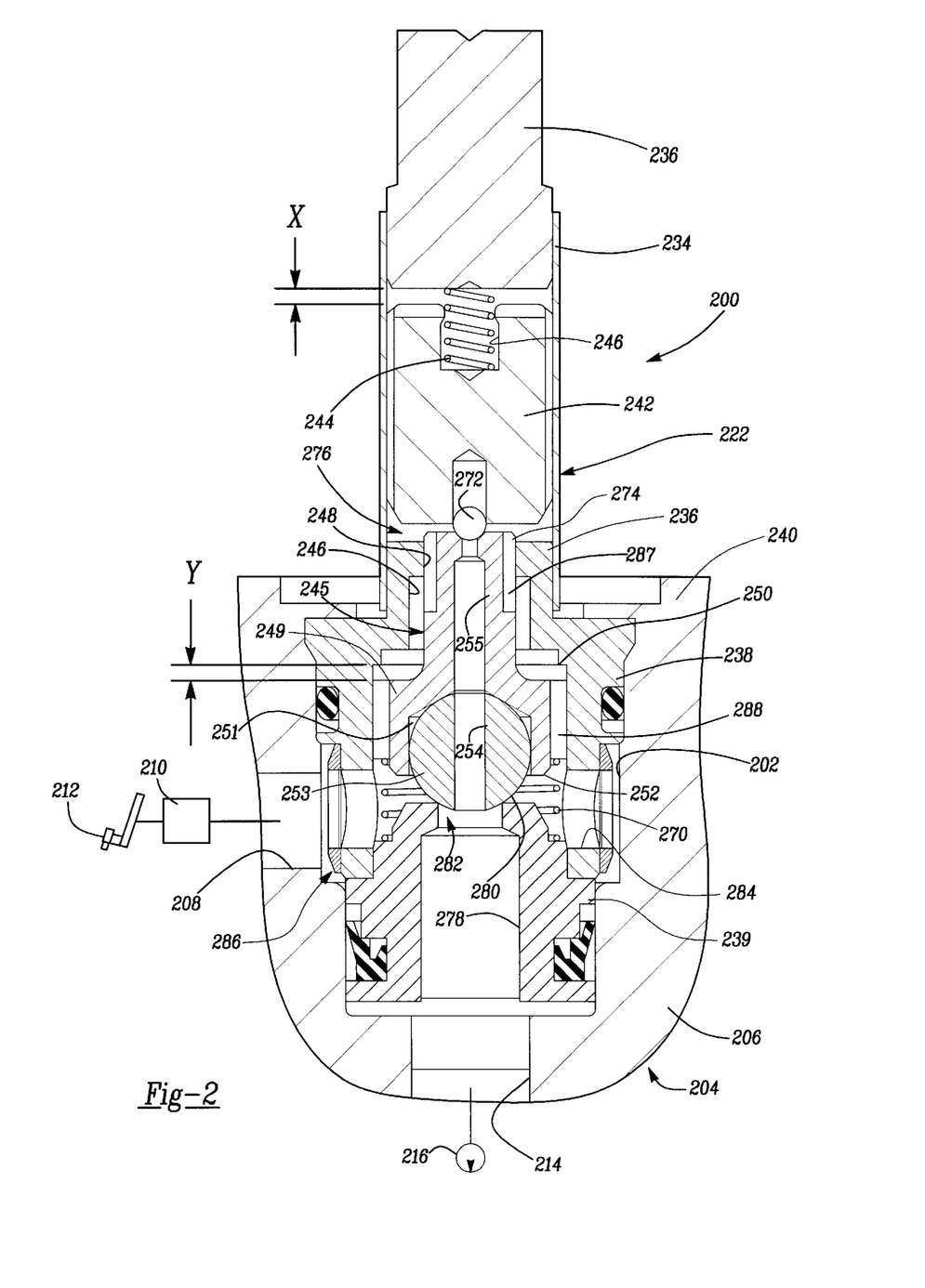
FIG. 2 is a sectional view of a second embodiment of a control valve according to the present invention, mounted on a hydraulic control unit in a hydraulic conduit between a master cylinder and an inlet to a pump.

A second embodiment of a fluid control valve according to the present invention is indicated generally at 200 in FIG. 2. The valve 200 is particularly adapted to control fluid pressure in an electronically controlled vehicular brake system. Such a brake system can including anti-lock, traction control, and vehicle stability control.

The control valve 200 is an electronically activated, normally closed solenoid valve mounted in a stepped bore 202 of a hydraulic control unit (HCU) 204 of the vehicular brake system. The HCU 204 includes a housing 206 in which the bore 202 is formed. The housing 206 includes additional bores (not illustrated) mounting other components such as isolation valves and dump valves, none of which are illustrated. A first fluid conduit 208 formed in the housing 206 is in fluid communication at one end with the bore 202 and is in fluid communication with a source of hydraulic brake fluid at the opposite end. Preferably, the source of hydraulic fluid is a master cylinder 210. A brake pedal 212 is connected to the master cylinder 210 in a well known manner. A second fluid conduit 214 formed in the housing 206 is in fluid communication at one end with the bore 202 and is in fluid communication with an inlet of a pump 216. While not so illustrated, the pump 216 is preferably mounted in a bore in the housing 206.

The control valve 200 is a normally closed solenoid valve. When the control valve 200 is not energized (the condition illustrated in FIG. 2), fluid from the master cylinder 210 is not in fluid communication with the inlet of the pump 216. When the control valve 200 is energized, fluid pressure passes through the inlet of the pump through a relatively large orifice. Such a relatively large orifice is desirable, particularly during traction control and/or vehicle stability control events.

The control valve 200 includes a coil subassembly (not illustrated) and a valve body subassembly 222. The coil subassembly includes a casing, a coil, and a flux ring, non of which are illustrated. The coil assembly is adapted to be connected to an electronic control module (not illustrated) for inducing a magnetic field in a well known manner.

The valve body subassembly 222 includes a sleeve 234. A pole piece 236 is preferably inserted into and secured to a first end of the sleeve 234. An opposite end of the sleeve 234 receives a neck 236 formed on an adapter 238. The adapter 238 is received in the stepped bore 202 of the housing 206. The adapter 238 is seated on a valve member 239, which is also received in the stepped bore 202. An annular lip 240, preferably formed by swaging, retains the adapter 238 and valve member 239 in the bore 202.

A generally cylindrical armature 242 is slidably received in the sleeve 234. A spring 244, illustrated as a coil spring, is placed between the pole piece 236 and the armature 242. A cavity 246 is formed in a first end of the armature 242 to receive and seat the spring 244. The spring 244 urges the armature downwardly away from the pole piece 236 a predetermined distance X in a normally closed position when the coil subassembly is not energized. When a magnetic field is induced by the energized coil subassembly, the armature 242 is urged toward the pole piece 236 against the force of the spring 244 to open the control valve 200.

A poppet 245 is slidably mounted in a stepped bore 246 formed in the adapter 238. A first end 247 of the poppet 245 is received in an opening 248 formed in the adapter 238. The poppet 245 includes a large diameter portion 249. As described below, the large diameter portion 249 engages a shoulder 250 formed in the stepped bore 246 of the adapter 238 to limit the travel of the poppet 245 with respect to the adapter 238. When the valve 200 is not energized, the large diameter portion 249 is spaced a predetermined distance Y from the shoulder.

A cavity 251 is formed in a second end 252 of the poppet. A ball 253 having a fluid passage 254 is retained in the cavity 251. The fluid passage 254 of the ball 253 is aligned with an axial fluid passage 255 formed through the poppet 245.

A spring 270 is provided between the poppet 245 and the valve member 239. A first end of the spring 270 engages the poppet 245. An opposite end of the spring 270 engages the valve member 239. As described below, the spring 270 urges the poppet 245 toward the armature 242 until the large diameter portion 249 engages the shoulder 259 when the control valve 200 is opened.

A ball 272 is pressed into a cavity in the armature 242 and is received in a seat 274 formed in the first end of the poppet 245. The seat 274 is preferably formed about the fluid passage 255. The ball 272 and the seat 274 cooperate to form a pilot valve 276 having a relatively small cross section. When the control valve 200 is not energized, the ball 272 engages the seat 274 to prevent fluid from passing through the pilot valve 276.

A fluid passage 278 is formed through the valve member 239. A seat 280 is formed about the fluid passage 277. The ball 253 and the valve seat 280 cooperate to form a primary valve 282 having a relatively large cross section. When the control valve 200 is not energized, the ball engages the seat 280 to prevent fluid from passing through the primary valve 282.

A plurality of fluid passages 284 are formed about the adapter 238. An is annular filter assembly 286 is fitted on the adapter 238 and surrounds the fluid passages 284. Fluid from the first fluid conduit 208 in the housing 206 can travel through the filter assembly 286 and into passages 284 to pass through the pilot valve 276 and/or the primary valve 282. A plurality of longitudinal slots 287 and 288 are formed on the outer surface of the poppet 245 to permit fluid to pass to the pilot valve 276.

As stated above, when the control valve 200 is not energized, a distance X is provided between the facing surfaces of the pole core 236 and the armature 242 and a distance Y is provided between facing surfaces of the large diameter portion 249 of the poppet 245 and the shoulder 250 of the adapter 238. The distance Y is less than the distance X.

When the control valve 200 is energized and the fluid pressure in the conduit 208 is relatively high, the armature 242 is urged toward the pole piece 236 against the force of the spring 244 while the poppet 245 remains stationary. As the armature 242 moves toward the pole piece 236, the pilot valve 276 is opened as the ball 272 separates from the seat 274. After the pressure difference has diminished so that less fluid force urges the poppet 245 toward the adapter 238, the poppet 245 is urged by spring 270 toward the armature 242 until the large diameter portion 249 contacts the shoulder 250. When the large diameter portion 249 contacts the shoulder 250 and the armature 242 travels the full distance X, the ball 272 is spaced from its seat 274. Thus, when the control valve 200 is opened by the coil subassembly, the pilot valve 276 and the primary valve 282 are open.

When the control valve 200 is energized and the fluid pressure in the conduit 208 is relatively low, the armature 242 is urged toward the pole piece 236 against the force of the spring 244 while the poppet 245 travels toward the armature 242 due to the force of spring 270. Thus, the pilot valve 276 remains closed until the large diameter portion 249 contacts the shoulder 250. When the armature 242 has traveled the complete distance X, the ball 272 is spaced from its seat 274 and the primary valve 282 is opened as the ball 253 is spaced from its seat 280.

Figure 3:
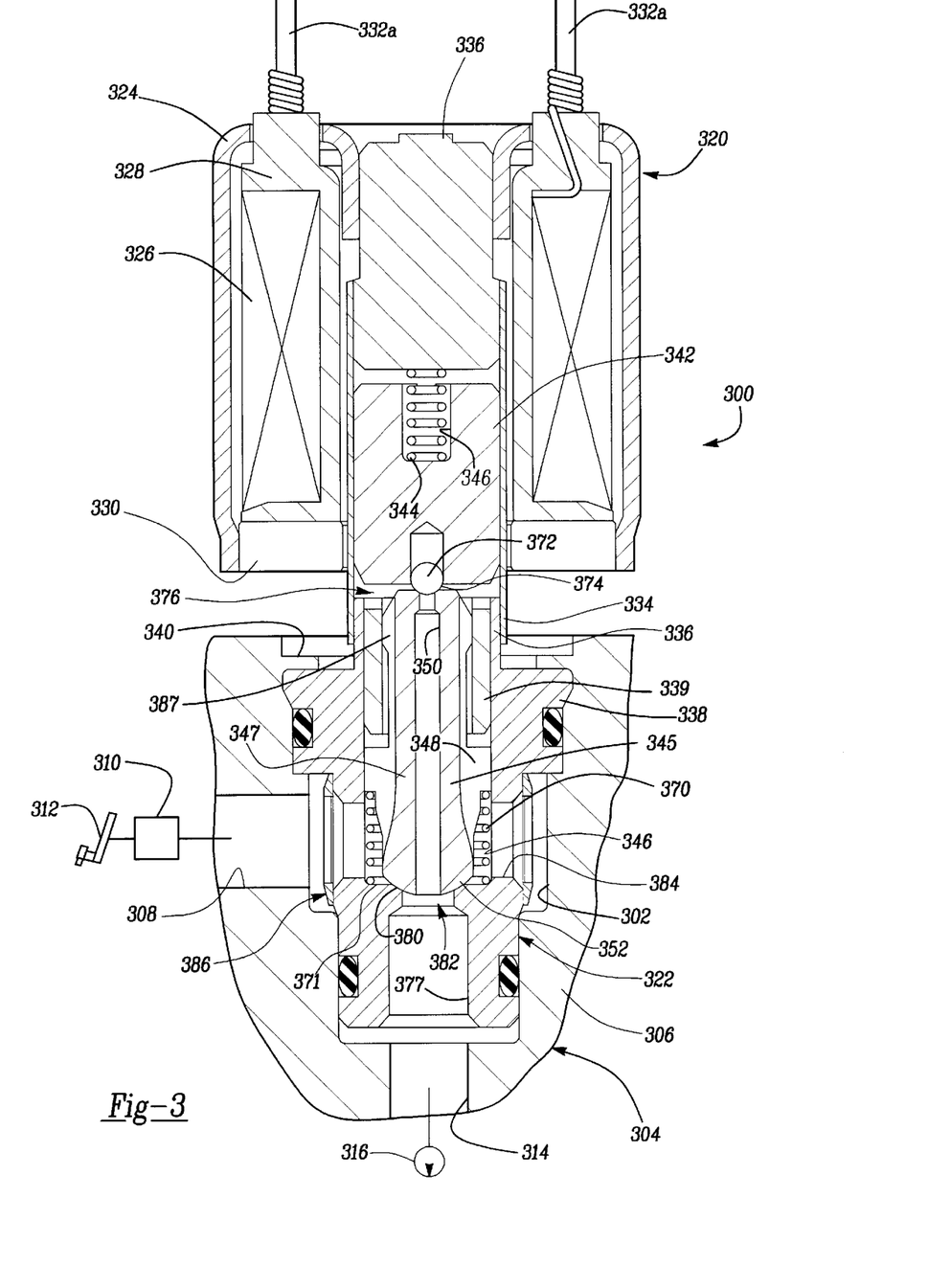
FIG. 3 is a sectional view of a third embodiment of a control valve according to the present invention, mounted on a hydraulic control unit in a hydraulic conduit between a master cylinder and an inlet to a pump.

A third embodiment of a fluid control valve according to the present invention is indicated generally at 300 in FIG. 3. The valve 300 is particularly adapted to control fluid pressure in an electronically controlled vehicular brake system. Such a brake system can including anti-lock, traction control, and vehicle stability control.

The control valve 300 is an electronically activated solenoid valve mounted in a stepped bore 302 of a hydraulic control unit (HCU) 304 of the vehicular brake system. The HCU 304 includes a housing 306 in which the bore 302 is formed. The housing 306 includes additional bores (not illustrated) mounting other components such as isolation valves and dump valves, none of which are illustrated. A first fluid conduit 308 formed in the housing 306 is in fluid communication at one end with the bore 302 and is in fluid communication with a source of hydraulic brake fluid at the opposite end. Preferably, the source of hydraulic fluid is a master cylinder 310. A brake pedal 312 is connected to the master cylinder 310 in a well known manner. A second fluid conduit 314 formed in the housing 306 is in fluid communication at one end with the bore 302 and is in fluid communication with an inlet of a pump 316. While not so illustrated, the pump 316 is preferably mounted in a bore in the housing 306.

The control valve 300 is a normally closed solenoid valve. When the control valve 300 is not energized (the condition illustrated in FIG. 3), fluid from the master cylinder 310 is not in fluid communication with the inlet of the pump 316. When the control valve 300 is energized, fluid pressure passes through the inlet of the pump 316 through a relatively large orifice. Such a relatively large orifice is desirable, particularly during traction control and/or vehicle stability control events.

The control valve 300 includes a coil subassembly 320 and a valve body subassembly 322. The coil subassembly 320 is preferably pressed onto the valve body subassembly 322. The coil subassembly 320 includes a casing 324, a coil 326 that can be mounted on a bobbin 328, and a flux ring 330. A pair of winding terminals 332a and 332b extend outwardly through respective openings in the casing 324 and are adapted to be connected to an electronic control module (not illustrated) for inducing a magnetic field in a well known manner.

The valve body subassembly 322 includes a sleeve 334. A pole piece 336 is preferably inserted into and secured to a first end of the sleeve 334. An opposite end of the sleeve 334 receives a neck 336 formed on a valve body 338. The valve body 338 is received in the stepped bore 302 of the housing 306. An annular lip 340, preferably formed by swaging, retains the valve seat 338 in the bore 302.

A generally cylindrical armature 342 is slidably received in the sleeve 334. A spring 344, illustrated as a coil spring, is placed between the pole piece 336 and the armature 342. A cavity 346 is formed in a first end of the armature 342 to receive and seat the spring 344. The spring 344 urges the armature downwardly away from the pole piece 336 in a normally closed position when the coil subassembly 320 is not energized. When a magnetic field is induced by the energized coil subassembly 320, the armature 342 is urged toward the pole piece 336 against the force of the spring 344 to open the control valve 300.

A poppet 345 is slidably mounted in an axial bore 346 formed in the valve seat 338. The poppet 345 includes a reduced diameter neck portion 347 and a flange 348, preferably formed at an approximate mid-point of the length of the poppet 345. A sleeve 349 is pressed into the bore 346 and surrounds the neck portion 347. An axial fluid passage 350 is formed through the poppet 345 from a first end to a second end. The second end of the fluid passage 350 terminates at a rounded or spherical surface 352 of the poppet 345.

A spring 370 is provided between the poppet 345 and the valve body 338. A first end of the spring 370 engages the flange 348 of the poppet 345. An opposite end of the spring 370 engages a shoulder 371 formed at the terminus of the bore 346. As described below, the spring 370 urges the poppet 345 toward the armature 342 until the flange 348 engages the sleeve 349 when the control valve 300 is opened.

A ball 372 is pressed into a cavity in the armature 342 and is received on a seat 374 formed in the first end of the poppet 345. The seat 274 is preferably formed about the fluid passage 264. The ball 372 and the seat 374 cooperate to form a pilot valve 376 having a relatively small cross section. When the control valve 300 is not energized, the ball 372 engages the seat 374 to prevent fluid from passing through the pilot valve 376.

A fluid passage 377 is formed through the valve body 338. A seat 380 is formed about the fluid passage 377. The rounded surface 352 of the poppet 345 and the valve seat 380 cooperate to form a primary valve 382 having a relatively large cross section. When the control valve 300 is not energized, the ball engages the seat 380 to prevent fluid from passing through the primary valve 382.

A plurality of fluid passages 384 are formed about the adapter 338. An annular filter assembly 386 is fitted on the adapter 338 and surrounds the fluid passages 384. Fluid from the first fluid conduit 308 in the housing 306 can travel through the filter assembly 386 and into passages 384 to pass through the pilot valve 376 and/or the primary valve 382. Longitudinal slots 387 are formed on the outer surface of the poppet 345 to direct fluid to the pilot valve 376.

When the control valve 300 is not energized, a distance X is provided between the facing surfaces of the pole core and the armature 342 and a distance Y is provided between facing surfaces of the sleeve and the flange of the poppet. The distance Y is less than the distance X.

When the control valve 300 is energized and the fluid pressure in the conduit is relatively high, the armature 342 is urged toward the pole piece 336 against the force of the spring 344 while the poppet 345 remains stationary. As the armature 342 moves toward the pole piece 236, the pilot valve 376 is opened as the ball 372 separates from the seat 374. After the pressure difference has diminished so that less fluid force urges the poppet 345 toward the seat 380, the poppet 345 is moved by spring 370 toward the armature 342 until the flange 348 contacts the sleeve 349. When the armature 342 has traveled the complete distance X, the ball 372 is spaced from its seat 374. Thus, when the control valve 300 is opened by the coil subassembly, the pilot valve 376 and the primary valve 382 are open.

When the control valve 300 is energized and the fluid pressure in the conduit 308 is relatively low, the armature 342 is urged toward the pole piece 336 against the force of the spring 344 while the poppet 345 travels toward the armature 342 due to the force of the spring 370. Thus, the pilot valve 376 remains closed until the flange 348 contacts the sleeve 349. When the armature 342 has traveled the complete distance X, the ball 372 is spaced from its seat 374 and the primary valve 382 is opened as the rounded surface 352 is spaced from its seat 380.

Figure 4:
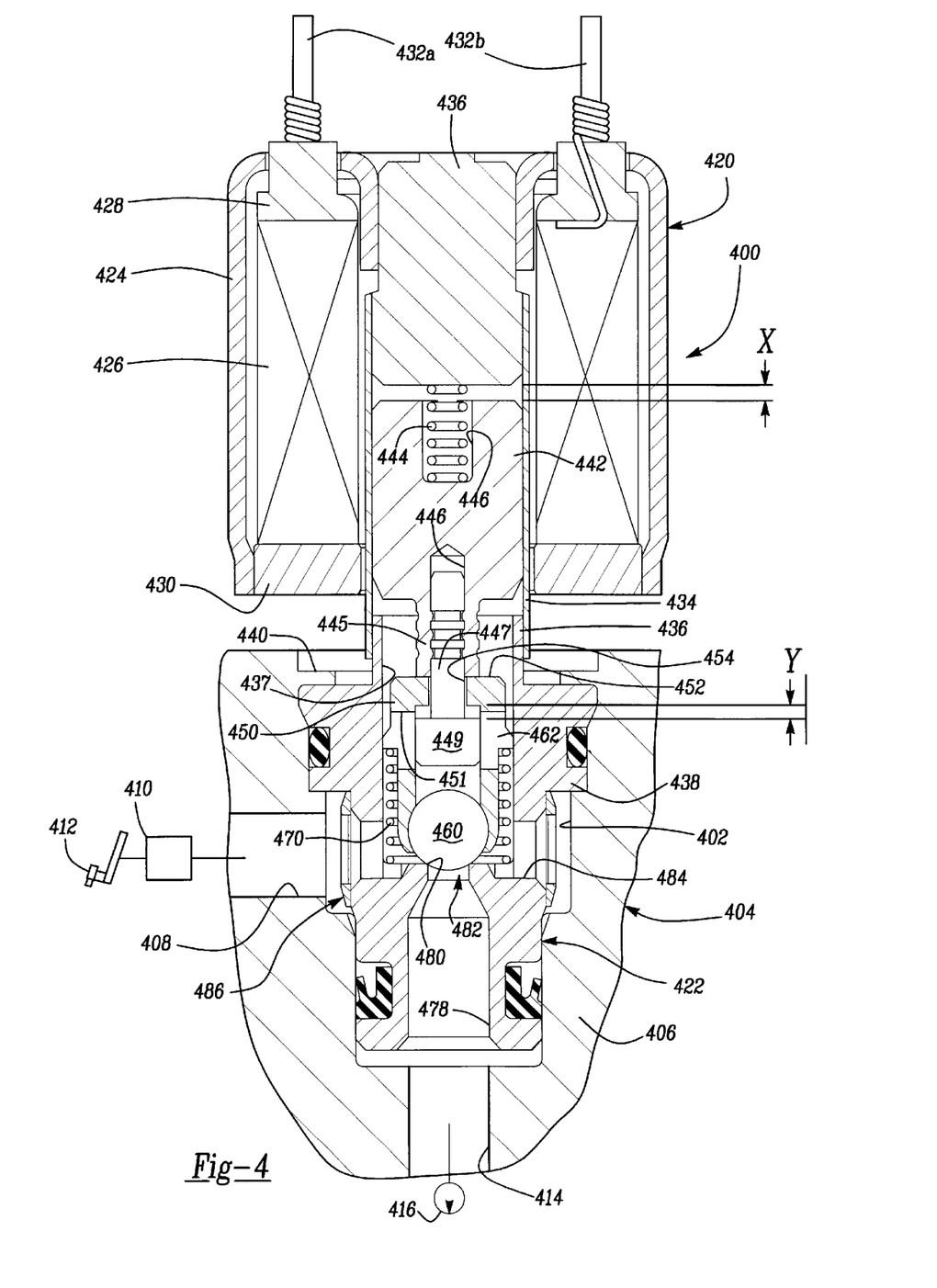
FIG. 4 is a sectional view of a fourth embodiment of a control valve according to the present invention, mounted on a hydraulic control unit in a hydraulic conduit between a master cylinder and an inlet to a pump.

A fourth embodiment of a fluid control valve according to the present invention is indicated generally at 400 in FIG. 4. The valve 400 is particularly adapted to control fluid pressure in an electronically controlled vehicular brake system. Such a brake system can including anti-lock, traction control, and vehicle stability control.

The control valve 400 is an electronically activated solenoid valve mounted in a stepped bore 402 of a hydraulic control unit (HCU) 404 of the vehicular brake system. The HCU 404 includes a housing 406 in which the bore 402 is formed. The housing 406 includes additional bores (not illustrated) mounting other components such as isolation valves and dump valves, none of which are illustrated.

A first fluid conduit 408 formed in the housing 406 is in fluid communication at one end with the bore 402 and is in fluid communication with a source of hydraulic brake fluid at the opposite end. Preferably, the source of hydraulic fluid is a master cylinder 410. A brake pedal 412 is connected to the master cylinder 410 in a well known manner. A second fluid conduit 414 formed in the housing 406 is in fluid communication at one end with the bore 402 and is in fluid communication with an inlet of a pump 416. While not so illustrated, the pump 416 is preferably mounted in a bore in the housing 406.

The control valve 400 is a normally closed solenoid valve. When the control valve 400 is not energized (the condition illustrated in FIG. 4), fluid from the master cylinder 410 is not in fluid communication with the inlet of the pump 416. When the control valve 400 is energized, fluid pressure passes through the inlet of the pump 416 through a relatively large orifice. Such a relatively large orifice is desirable, particularly during traction control and/or vehicle stability control events.

The control valve 400 includes a coil subassembly 420 and a valve body subassembly 422. The coil subassembly 420 is preferably pressed onto the valve body subassembly 422. The coil subassembly 420 includes a casing 424, a coil 426 that can be mounted on a bobbin 428, and a flux ring 430. A pair of winding terminals 432a and 432b extend outwardly through respective openings in the casing 424 and are adapted to be connected to an electronic control module (not illustrated) for inducing a magnetic field in a well known manner.

The valve body subassembly 422 includes a sleeve 434. A pole piece 436 is preferably inserted into and secured to a first end of the sleeve 434. An opposite end of the sleeve 434 receives a neck 436 formed on a valve body 438. The valve body 438 is received in the stepped bore 402 of the housing 406. An annular lip 440, preferably formed by swaging, retains the valve seat 438 in the bore 402.

A generally cylindrical armature 442 is slidably received in the sleeve 434. A spring 444, illustrated as a coil spring, is placed between the pole piece 436 and the armature 442. A cavity 446 is formed in a first end of the armature 442 to receive and seat the spring 444. The spring 444 urges the armature downwardly away from the pole piece 436 in a normally closed position when the coil subassembly 420 is not energized. When a magnetic field is induced by the energized coil subassembly 420, the armature 442 is urged toward the pole piece 436 against the force of the spring 444 to open the control valve 400.

A reduced-diameter extension 445 is formed on a second end of the armature 442. An axial bore 446 is formed in the extension 445. A stem 447 is pressed into the bore 446. A cap 449 on the stem 447 has a diameter larger that a diameter of the stem 447. A generally cylindrical cage 450 is located adjacent the extension 445. The cage 450 includes a plurality of fluid openings 451 that permit fluid to pass into an interior volume of the cage 450. An end surface 452 of the cage 450 includes an opening 454. The stem 447 is received in the opening 454 so that the cage 448 is movable relative to the extension 445. The extension 445 forms a first stop to limit travel of the cage 450 toward the armature 442and the cap 449 forms a second stop to limit travel of the cage 450 away from the armature 442.

A ball 460 is retained on the cage 450 opposite the end surface 454. Preferably, the ball 460 is retained by crimping sidewalls of the cage 450. A flange 462 is formed about the cage 450. A spring 470 is provided between the cage 450 and the valve body 438. A first end of the spring 470 engages the flange 462. An opposite end of the spring 470 engages and is seated in a landing 471 formed in the valve body 438.

The cage 450 is received in a bore 437 of the valve body 438. An axial fluid passage 478 having a relatively large diameter is formed in the valve body 438. The fluid passage 478 is in fluid communication with the second fluid conduit 414 in the housing 406. A seat 480 is formed in the valve body 438. The ball 460 and the seat 480 form a primary valve 482 having a relatively large cross section. When the control valve 400 is not energized, the ball 460 engages the seat 480 to prevent fluid from passing through the primary valve 482.

A plurality of fluid passages 484 are formed about the valve body 438. An annular filter assembly 486 is fitted on the valve body 438 and surrounds the fluid passages 484. Fluid from the first fluid conduit 408 in the housing 406 can travel through the filter assembly 486 and into passages 484 to pass through the primary valve 482.

When the control valve 400 is not energized, a distance X is provided between the facing surfaces of the pole core 436 and the armature 442 and a distance Y is provided between facing surfaces of the end surface 452 of the cage 450 and the cap of the stem. The distance Y is less than the distance X.

When the control valve 400 is energized and the fluid pressure in the conduit 408 is relative high, the armature 442 is urged toward the pole piece 436 against the force of the spring 444 while the cage 450 remains stationary and the ball sits in seat 480 to block flow through the primary valve 482. After the armature 442 travels the distance Y. the cap lifts the cage 450 so that the ball is pulled from its seat 480 to open the primary valve 482.

When the control valve 400 is energized and the fluid pressure in the conduit 408 is relatively low, the armature 442 is urged toward the pole piece 436 against the force of the spring 444 while the cage 450 travels toward the armature 442 due to the force of the spring 470. As the cage 450 travels toward the armature 442, the ball 460 is spaced from its seat 480 to open the primary valve 482.

Figure 5:
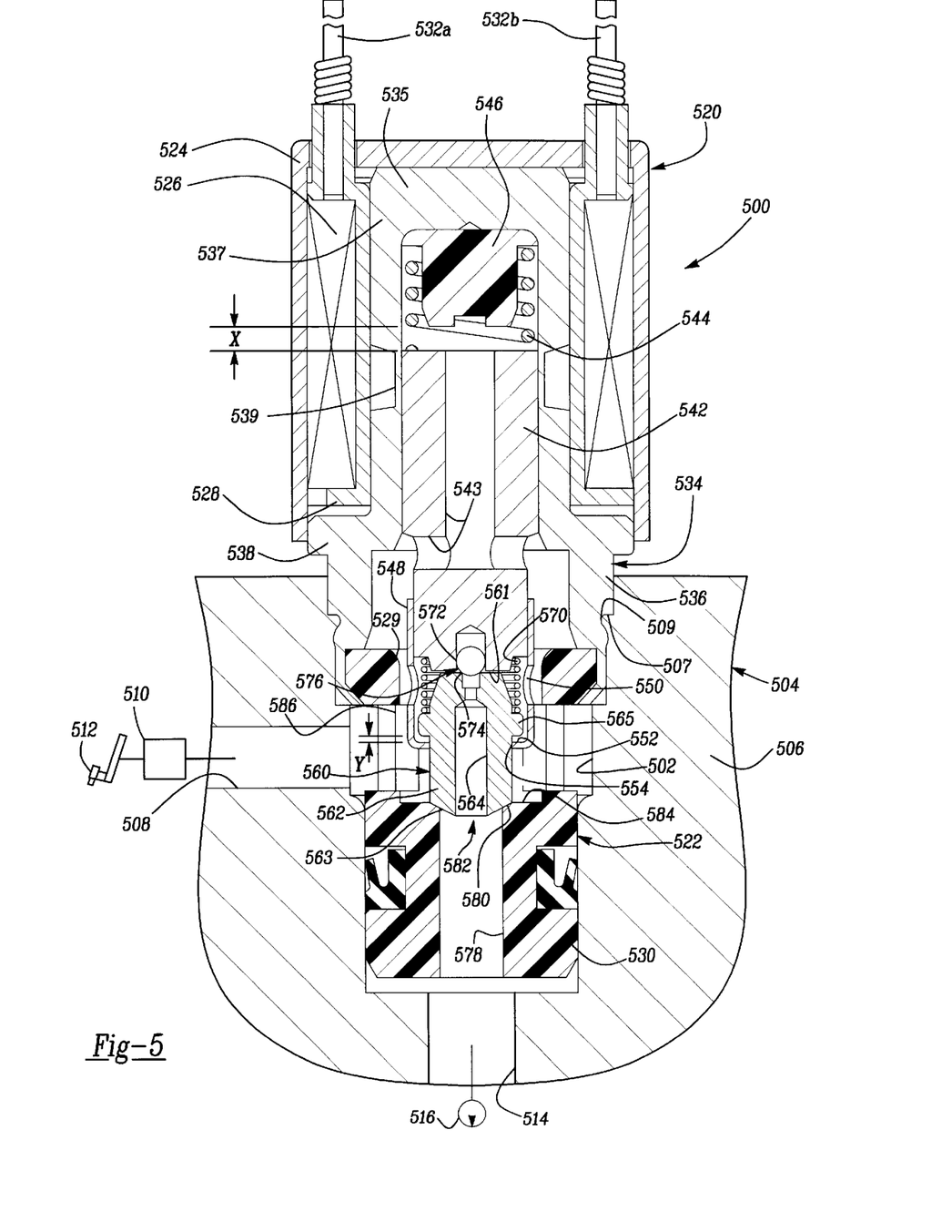
FIG. 5 is a sectional view of a fifth embodiment of a control valve according to the present invention, mounted on a hydraulic control unit in a hydraulic conduit between a master cylinder and an inlet to a pump.

A fifth embodiment of a fluid control valve according to the present invention is indicated generally at 500 in FIG. 5. The valve 500 is particularly adapted to control fluid pressure in an electronically controlled vehicular brake system. Such a brake system can including anti-lock, traction control, and vehicle stability control functions.

The control valve 500 is an electronically activated solenoid valve mounted in a hydraulic control unit (HCU) 504 of the vehicular brake system. The HCU 504 includes a housing 506 in which a stepped bore 502 is formed. The housing 506 includes additional bores (not illustrated) mounting other components such as isolation valves and dump valves, none of which are illustrated. A first fluid conduit 508 formed in the housing 506 is in fluid communication at one end with the bore 502 and is in fluid communication with a source of hydraulic brake fluid at the opposite end. Preferably, the source of hydraulic fluid is a master cylinder 510. A brake pedal 512 is connected to the master cylinder 510 in a well-known manner. A second fluid conduit 514 formed in the housing 506 is in fluid communication at one end with the bore 502 and is in fluid communication with an inlet of a pump 516. While not so illustrated, the pump 516 is preferably mounted in a bore in the housing 506.

The control valve 500 is a normally closed solenoid valve. When the control valve 500 is not energized (the condition illustrated in FIG. 5), fluid from the master cylinder 510 is not in fluid communication with the inlet of the pump 516. When the control valve 500 is energized, fluid pressure passes through the inlet of the pump 516 through a relatively large orifice. Such a relatively large orifice is desirable, particularly during traction control and/or vehicle stability control events. During these events, it is desirable to quickly provide fluid from the master cylinder to the pump 516. The control valve 500 is commonly referred to as a supply valve.

The control valve 500 includes a coil subassembly 520 and a valve body subassembly 522. The coil subassembly 520 is preferably pressed onto the valve body subassembly 522 and retained by any desired means including an interference fit, welding, adhesive, etc.

The coil subassembly 520 includes a casing 524 and a coil 526 that can be mounted on a bobbin 528. In other embodiments, a bobbin-less coil can be received in the casing 524. A pair of winding terminals 532a and 532b extend outwardly through respective openings in the casing 524 and are adapted to be connected to an electronic control module (not illustrated) for inducing a magnetic field in a well known manner.

The valve body subassembly 522 includes a flux tube 534. The flux tube 534 includes an integrally formed end cap 535 at one end and an integrally formed projecting collar 536 at the opposite end. A sleeve portion 537 of the flux tube 534 extends between the end cap 535 and the collar 536. A radial flange 538 is formed on the flux tube 534 at the junction of the sleeve portion 537 and the collar 536. A mid-section 539 of the sleeve portion 537 preferably has a reduced thickness as compared to the remained of the sleeve portion 537.

A generally cylindrical armature 542 is slidably received in the flux tube 534. Fluid passages 543 are provided in the armature 542. A spring 544, illustrated as a coil spring, is placed between the end cap 535 and the armature 542. A spacer 546, preferably formed from a non-magnetic material such as a plastic material, is provided between the end cap 535 and the armature 542 to limit the travel of the armature 542 toward the end cap 535. The spring 544 urges the armature 542 away from the end cap 535 a predetermined distance X to a normally closed position when the coil subassembly 520 is not energized. When a magnetic field is induced by the energized coil subassembly 520, the armature 542 is drawn toward the end cap 535 against the force of the spring 544 to open the control valve 500.

A generally cylindrical cage 548 is secured to a reduced-diameter portion of the armature 542. The cage 548 includes a plurality of fluid openings 550 that permit fluid to pass into an interior volume of the cage 548. An end 552 of the cage 548 includes an opening 554.

A generally cylindrical poppet 560 is received in the interior volume of the cage 548 between the armature 542 and the end 552. The poppet 560 includes a first surface 561 (preferably planar) facing the armature 542 and a projection 562. The projection 562 is slidably received in the opening 554 in the end 552. A second surface 563 (preferably rounded or spherical) is formed on the poppet 560 opposite planar surface 561. A fluid passage 564 is formed through the poppet 560 from the first surface 561 to the second surface 563. A radial flange 565 is formed about the projection 562. The flange 565 is spaced a predetermined distance Y from the end 552 when the control valve 500 is not energized.

A spring 570 is provided between the armature 542 and the poppet 560. A first end of the spring 570 engages the armature 542. An opposite end of the spring 570 engages the flange 565 of the poppet 560. A ball 572 is pressed into a cavity in the armature 542 and is received in a valve seat 574 formed in the first surface 561. The valve seat 574 is preferably formed about the fluid passage 564. The ball 572 and the valve seat 574 cooperate to form a pilot valve 576 having a relatively small cross section. When the control valve 500 is not energized, the ball 572 engages the valve seat 574 to prevent fluid from passing through the pilot valve 576.

The cage 548 and the projection 562 of the poppet 560 are received in a bore 529 of a seat 530. An axial fluid passage 578 having a relatively large diameter is formed in the seat 530. The fluid passage 578 is in fluid communication with the second fluid conduit 514 in the housing 506. Preferably, the seat 530 is formed from a molded, non-magnetic material such as a plastic. A lower end of the collar 536 is crimped onto the seat 530. As the seat 530 and flux tube 534 are pressed into the bore 502, material 507 of the housing 506 is forced into a groove 509 of the flux tube 534 to retain the valve body subassembly 522 on the housing 506. The coil subassembly 520 is fitted over the sleeve portion 537 and end cap 535 of the projecting flux tube 534.

A valve seat 580 is formed in the seat 530. The second surface 563 and the valve seat 580 form a primary valve 582 having a cross section larger than the pilot valve 576. When the control valve 500 is not energized, the second surface 563 contacts the valve seat 580 to prevent fluid from passing through the primary valve 582.

A plurality of fluid passages 584 are formed in the seat 530. An annular filter 586 is provided about the fluid passages 584. Preferably, the filter 586 is integrally molded into seat 530. Fluid from the first fluid conduit 508 in the housing 506 passes through the filter 586 and into passages 584 to pass through the pilot valve 576 and/or the primary valve 582.

As stated above, when the control valve 500 is not energized, a distance X is provided between the facing surfaces of the end cap 535 and the armature 542 and a distance Y is provided between facing surfaces of the flange 565 of the poppet 560 and the end 552 of the cage 548. The distance Y is less than the distance X.

When the control valve 500 is energized, the armature 542 is urged toward end cap 535 against the force of the spring 544. As the armature 542 moves toward the end cap 535, the pilot valve 576 is opened as the ball 572 separates from the valve seat 574. After the armature 542 and the attached cage 548 travel the distance Y, the end 552 of the cage 548 lifts the second surface 563 away from the valve seat 580 to open the primary valve 582. When the armature 542 has reached its full travel (the distance X), both the pilot valve 576 and the primary valve 582 are open to permit fluid to flow from the master cylinder 510 to the inlet of the pump 516. The second spring 570 forces the poppet 560 against the end 552 so that the pilot valve 576 is open when the control valve 500 is fully energized.

The spring force of the second spring 570 is selected so that it is less than the spring force of the first spring 544. In one example, the force of the first spring 544 is 0.6 N and the force of the second spring 570 is 0.1 N. When the control valve 500 is first energized, the electromagnetic flux works against 0.5 N (0.6 N–0.1 N). After the cage contacts the poppet, the electromagnetic flux works against the 0.6 N force of the first spring 544 between the armature 542 and the end cap 535.

The second spring 570 also maintains the poppet against the cage when the control valve 500 is fully opened, thereby keeping the poppet properly aligned within the cage. Maintaining the position of the poppet improves resealing when the control valve 500 is closed.

Increasing both the forces of the first spring 544 and the second spring 570 by a similar amount results in a low differential force that acts to first close the control valve 500 when it is de-energized. Improved closing response is possible without compromising the ability of the electromagnetic flux to open the pilot valve under high fluid pressure.

Increasing both the forces of the first spring 544 and the second spring 570 also improves the ability to control the valve 500 in intermediate positions between fully closed and fully opened. This performance reduces the pressure differential beyond which the primary valve will not open. Pulsed or current control of the coil enhances control of intermediate positions. Opening only the pilot valve during master cylinder pressure applies above few Bar reduces noise and vibration and improves pressure control resolution while still achieving sufficient pressure apply rate capability.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A hydraulic control unit of a vehicular brake system comprising:
   a housing having a bore formed therein;
   a normally closed solenoid valve retained in the bore of the housing, the solenoid valve including a primary valve and a pilot valve, wherein a cross section of the primary valve is greater that a cross section of the pilot valve; and
   a spring cooperating with the pilot valve so that the pilot valve is open when the primary valve is open.

2. The hydraulic control unit specified in claim 1 wherein the primary valve is formed by a valve seat in a seat and end surface of a poppet.

3. The hydraulic control unit specified in claim 2 wherein the pilot valve is formed by a valve seat in an opposite end surface of the poppet and an armature.

4. The hydraulic control unit specified in claim 3 wherein the armature is slidably received in a sleeve.

5. The hydraulic control unit specified in claim 4 including a spacer provided in the sleeve opposite the poppet to limit the travel of the armature.

6. The hydraulic control unit specified in claim 5 wherein the spacer is formed from a non-magnetic material.

7. The hydraulic control unit specified in claim 2 wherein the seat is formed from a non-magnetic material.

8. A hydraulic control unit of a vehicular brake system comprising:
   a housing having a bore formed therein;
   a normally closed solenoid valve retained in the bore of the housing, the solenoid valve including a flux tube retained on a seat, an armature slidably received in the flux tube, a first spring biasing the armature a predetermined distance X from an end cap when the solenoid valve is not energized, a cage attached to the armature and receiving a poppet, and a second spring biasing the poppet a predetermined distance Y from an end of the cage when the solenoid valve is not energized, a primary valve formed between an end of the poppet and the seat, and a pilot valve formed between an opposite end of the poppet and the armature, wherein the second spring urges the pilot valve open when the primary valve is open.

9. The hydraulic control unit specified in claim 8 wherein the distance X is greater than the distance Y.

10. The hydraulic control unit specified in claim 8 wherein the primary valve is formed by a valve seat in the seat and a rounded end surface of the poppet.

11. The hydraulic control unit specified in claim 8 wherein the pilot valve is formed by a valve seat in the opposite end surface of the poppet and the armature.

12. The hydraulic control unit specified in claim 8 wherein the seat is formed from a non-magnetic material.

13. The hydraulic control unit specified in claim 8 including a spacer provided in the flux tube opposite the poppet to limit the travel of the armature.

14. The hydraulic control unit specified in claim 13 wherein the spacer is formed from a non-magnetic material.

15. A hydraulic control unit including a normally closed, solenoid supply valve for a vehicular braking system, the supply valve comprising:
   a coil subassembly for generating an electromagnetic force; and
   a valve body subassembly including a primary valve that is open when the supply valve is fully energized and a pilot valve that is opened by a spring when the supply valve is fully energized.

16. The hydraulic control unit specified in claim 15 wherein a cross section of the primary valve is greater than a cross section of the pilot valve.

17. The hydraulic control unit specified in claim 15 including a flux tube retained on a seat, the flux tube including an end cap, an armature slidably received in the flux tube, a first spring biasing the armature a predetermined distance X from the end cap when the solenoid valve is not energized, a cage attached to the armature and receiving a poppet, and a second spring biasing the poppet a predetermined distance Y from an end of the cage when the solenoid valve is not energized, wherein the primary valve is formed between an end of the poppet and the seat, the pilot valve is formed between an opposite end of the poppet and the armature, and the second spring urges the pilot valve open when the primary valve is open.

18. The hydraulic control unit specified in claim 17 wherein the distance X is greater than the distance Y.

19. The hydraulic control unit specified in claim 17 wherein the seat is formed from a non-magnetic material.

20. The hydraulic control unit specified in claim 17 including a spacer provided in the flux tube opposite the poppet to limit the travel of the armature.

\* \* \* \* \*